US012710520B2

(12) United States Patent
Lehning et al.

(10) Patent No.: US 12,710,520 B2
(45) Date of Patent: Aug. 18, 2026

(54) METHOD FOR POSITION CALIBRATION OF A CAMERA AND A LIDAR SENSOR USING A CALIBRATION BOARD, AND A POSITION CALIBRATION SYSTEM

(71) Applicant: SICK AG, Waldkirch (DE)

(72) Inventors: Michael Lehning, Hildesheim (DE); Matthias Honal, Wittnau (DE); Raphael Engesser, Au (DE); Manuel Aiple, Denzlingen (DE)

(73) Assignee: SICK AG, Waldkirch (DE)

( * ) Notice: Subject to any disclaimer, the term of this patent is extended or adjusted under 35 U.S.C. 154(b) by 390 days.

(21) Appl. No.: 18/382,172

(22) Filed: Oct. 20, 2023

(65) Prior Publication Data

US 2024/0183962 A1 Jun. 6, 2024

(30) Foreign Application Priority Data

Oct. 21, 2022 (DE) ......................... 102022127858.1

(51) Int. Cl.
*G01S 7/497* (2006.01)
*B60W 10/18* (2012.01)
(Continued)

(52) U.S. Cl.
CPC ........... *G01S 7/4972* (2013.01); *B60W 10/18* (2013.01); *B60W 10/20* (2013.01);
(Continued)

(58) Field of Classification Search
CPC ........ G01S 7/4972; G01S 17/86; G01S 17/87; G01S 17/931; B60W 10/18; B60W 10/20;
(Continued)

(56) References Cited

U.S. PATENT DOCUMENTS 11,453,348 B2 * 9/2022 Wang .................... G01S 7/4813
2015/0352859 A1 12/2015 Bai et al.
(Continued)

FOREIGN PATENT DOCUMENTS

CN 110766758 A 2/2020
CN 110766758 B 8/2022

OTHER PUBLICATIONS

Chai, Ziqi et al., "A Novel Method for LiDAR Camera Calibration by Plane Fitting", Proceedings of the 2018 IEEE/ASME International Conference on Advanced Intelligent Mechatronics (AIM), Auckland, New Zealand, Jul. 9-12, 2018.
(Continued)

*Primary Examiner* — Daryl C Pope
(74) *Attorney, Agent, or Firm* — Nath, Goldberg & Meyer; Jerald L. Meyer

(57) ABSTRACT

The method for position calibration serves to fuse images of a camera and a LIDAR sensor. The camera records an image of a calibration board, wherein the pose of the calibration board relative to the camera can be determined based on known patterns. The LIDAR sensor records an image of the calibration board, wherein a pose of the calibration board relative to the LIDAR sensor can be determined based on additional reflection regions on the calibration board. Based on both poses, images that are recorded by the camera and/or the LIDAR sensor can respectively be converted into a common coordinate system or into the coordinate system of the other image in the following. Objects that are detected in one image can thereby be verified in another image.

20 Claims, 11 Drawing Sheets

Figure 1:
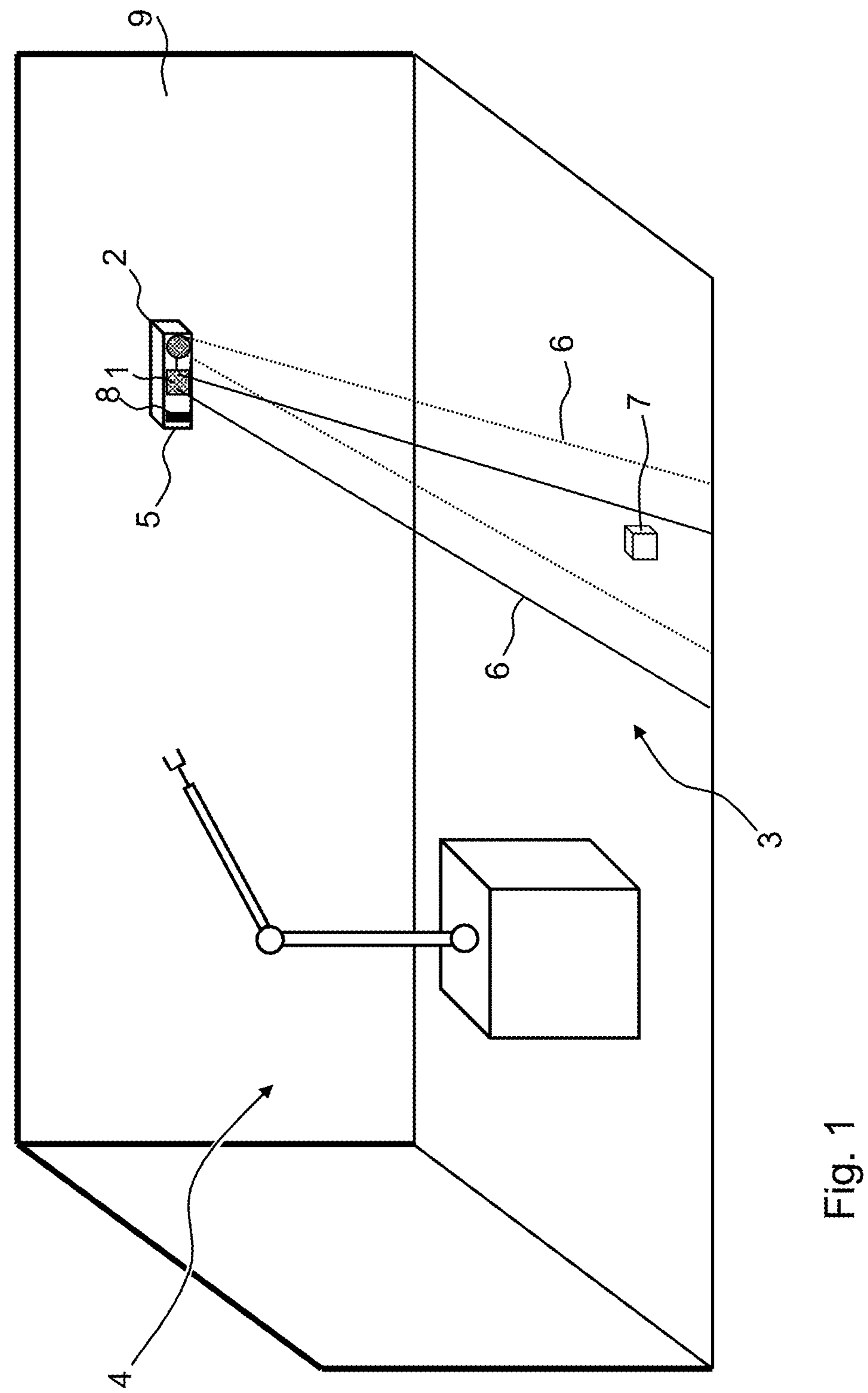

(51) Int. Cl.

| | |
|---|---|
| ***B60W 10/20*** | (2006.01) |
| ***B60W 30/095*** | (2012.01) |
| ***B60W 50/14*** | (2020.01) |
| ***B60W 60/00*** | (2020.01) |
| ***G01S 17/86*** | (2020.01) |
| ***G01S 17/87*** | (2020.01) |
| ***G01S 17/931*** | (2020.01) |
| ***G06T 7/80*** | (2017.01) |

(52) U.S. Cl.
CPC ........ *B60W 30/0956* (2013.01); *B60W 50/14* (2013.01); *B60W 60/0015* (2020.02); *G01S 17/86* (2020.01); *G01S 17/87* (2013.01); *G01S 17/931* (2020.01); *G06T 7/80* (2017.01); *B60W 2300/121* (2013.01); *B60W 2420/403* (2013.01); *B60W 2420/408* (2024.01); *G06T 2207/10028* (2013.01); *G06T 2207/30244* (2013.01); *G06T 2207/30252* (2013.01)

(58) Field of Classification Search
CPC ............ B60W 30/0956; B60W 50/14; B60W 60/0015; B60W 2300/121; B60W 2420/403; B60W 2420/408; G06T 7/80; G06T 2207/10028; G06T 2207/30244; G06T 2207/30252
See application file for complete search history.

(56) References Cited

U.S. PATENT DOCUMENTS

2020/0174107 A1 6/2020 Briggs et al.
2021/0316669 A1 10/2021 Wang

OTHER PUBLICATIONS

Dhall, Ankit et al., “LiDAR-Camera Calibration using 3D-3D Point correspondences”, work done during an intership at Robotics Research Center at IIIT-H, May 27, 2017; arXiv:1705.09785v1 [cs.RO].
Grater, Johannes et al., “Photometric Laser Scanner to Camera Calibration for Low Resolution Sensors”, Dept. of Measurement and Control, Karlsruhe Institute of Technology, Aug. 1, 2017.
Liao, Ruiying et al., “Flexible calibration method forl ine-scan cameras using a stereo target with hollow stripes”, Elsevier, Science Direct, Optics and Lasers in Engineering, 113 (2019) 6-13 https://www.sciencedirect.com/science/article/pii/S0143816618308984?via%3Dihub.
Lyu, Yecheng et al., “An Interactive LiDAR to Camera Calibration”, Dept of Electrical and Computer Engineering, Worcester Polytechnic Institute, Worcester, MA 01609; arXiv:1093.02122v1 [eess.IV] Mar. 6, 2019.
Office action issued Jun. 20, 2023 for DE 10 2022 127 858.1.
Sim, Sungdae et al., “Indirect Correspondence-Basedrobust Extrinsic Calibration of LiDAR and Camera”, Sensors 2016, 16, 933.
Su, Daobilige et al., “Improved Cross-Ratio Invariant-Based Intrinsic Calibration of a Hyperspectral Line-Scan Camera”, Sensors 2018, 18, 1885.
Garrido-Jurado, S. et al., “Automatic generation and detection of highly reliable fiducial markers under occlusion” Pattern Recognition, Jun. 2014.
“Camera Calibration and 3D Reconstruction”, OpenCV 2.4 13.2 documention Jan. 10, 2024, 18:24 https://docs.huihoo.com/opencv/2.4-documentation/modules/calib3d/doc/camera_calibration_and_3d_reconstruction. html.
“Camera calibration with openCV” OpenCV: Camera calibration With OpenCV Jan. 9, 2024, 10:43 tutorial_camera_calibration.html 1/7 The Wayback Machine—https://web.archive.org/web/20220705175821/https://docs.opencv.org/4.x/d4/d94/tutorial_camera_calibration.html.
“Pose computation overview”, OpenCV: Perspective-n-Point (PnP) pose computation, Jan. 9, 2024, 10:45 The Wayback Machine—https://web.archive.org/web/20220815132248/https://docs.opencv.org/4.x/d5/d1f/calib3d_solvePnP.html.
“Plane modelsegmentation”, tutorial, The Wayback Machine—https://web.archive.org/web/20220704150935/https://pointclouds.org/documentat . . . Point Cloud Library.
Tsai, Robert Y., “A Versatile Camera Calibration Technique for High-Accuracy 3D Machine Vision Metrology using off-the-Shelf TV Cameras and Lenses”, IEEE Jouranl of Robotics and Automation, vol. R1-3, No. 4, Aug. 1987.
European Search Report dated Mar. 11, 2024 corresponding to application No. 23203375.3-1206.

* cited by examiner

METHOD FOR POSITION CALIBRATION OF A CAMERA AND A LIDAR SENSOR USING A CALIBRATION BOARD, AND A POSITION CALIBRATION SYSTEM

The invention relates to a method for position calibration of a camera and a LIDAR sensor using a calibration board and to a position calibration system for position calibration of the camera and the LIDAR sensor.

Various types of obstacle detection systems, among other things, are used in autonomously driving vehicles for obstacle detection. For example, video cameras and LIDAR sensors are used to be able to detect obstacles. The images generated by the obstacle detection systems are preferably evaluated together. In this respect, it is important to know where a detected obstacle on an image that was recorded by one obstacle detection system is located in another image that was recorded by the other obstacle detection system. It should be possible to merge the results of the obstacle detection systems. However, mechanical tolerances when installing the obstacle detection systems are problematic, as is the case when assembling a vehicle. A small error in the alignment of the LIDAR sensor causes a large deviation at a distance of already 50 m. A detected obstacle in the image of the LIDAR sensor is suddenly located at a completely different position. A detected collision is suddenly no longer a collision and an obstacle that was detected outside the road can suddenly turn into a dangerous situation.

From Chai, Z., Sun, Y., and Xiong, Z. (2018). "A novel method for LIDAR camera calibration by plane fitting." 2018 IEEE/ASME International Conference on Advanced Intelligent Mechatronics (AIM), IEEE, 286-291, it is known to use a three-dimensional calibration cube. From the viewpoint of the LIDAR sensor, up to three mutually orthogonal surfaces are then determined in 3D space. From this, the overall position of the cube in 3D space can be determined. Each partial surface is provided with a marker code so that the position of the code from the viewpoint of the camera can be inferred here in 3D by back projection. Using these separately determined values, the registration between the 3D space from the viewpoint of the LIDAR sensor and the 3D space from the viewpoint of the camera is then finally determined.

The disadvantage of this method is that the camera already has to be calibrated. Furthermore, the calibration cube is large and unwieldy, which makes it difficult to use in practice.

It is therefore the object of the present invention here to provide a method for position calibration of a camera and a LIDAR sensor that can be performed particularly efficiently.

The object is satisfied by the method for position calibration of a camera and a LIDAR sensor using a calibration board according to independent claim 1 and by the position calibration system according to claim 15. Claims 2 to 14 describe advantageous further developments of the method and claim 16 describes an autonomously driving vehicle that comprises a position-calibrated camera in addition to a LIDAR sensor.

In the following, the method in accordance with the invention for position calibration of a camera and a LIDAR sensor using a calibration board will be described. The calibration board comprises known patterns. These known patterns have a different brightness. The known pattern preferably comprises the colors black and white. Furthermore, additional reflection regions are applied to the calibration board that have a higher reflectivity than the known patterns of different brightness. Reflectivity is to be understood as the ratio between reflected and incident intensity as a quantity of energy, for example in the case of electromagnetic waves (luminous flux).

In a first method step, at least one image of the calibration board is recorded by the camera. In this respect, the pose of the calibration board relative to the camera is determined based on the known patterns of different brightness. The term "pose" refers to the position and orientation of the calibration board, in particular in the camera coordinate system.

In a second method step, a laser light is transmitted from the LIDAR sensor to the calibration board. This is in particular to be understood as the laser light being transmitted by the LIDAR sensor not only to the calibration board, but also to the regions surrounding the calibration board.

In a third method step, at least one image is recorded with the LIDAR sensor and the regions of high reflectivity are determined based on intensity values of the laser light reflected by the calibration board.

In a fourth method step, the pose of the calibration board relative to the LIDAR sensor is determined based on the known reflection regions and the determined regions of high reflectivity.

In general, the image with the camera and the image with the LIDAR sensor can be recorded in parallel. The method steps therefore do not represent a mandatory time sequence. The laser light from the LIDAR sensor naturally has to be transmitted first before the pose of the calibration board relative to the LIDAR sensor can be determined. However, the determination of the pose of the calibration board relative to the camera can take place in parallel.

Subsequently, in a first alternative, both images can be converted into a common coordinate system (GKS) based on the determined poses. In this case, the images that were recorded by the camera and the LIDAR sensor are converted into a common coordinate system (GKS).

In a second alternative, one image that was recorded by one sensor is converted into the coordinate system of the other image that was recorded by the other sensor based on the determined poses. Thus, the image that was recorded by the camera can be converted into the coordinate system of the image that was recorded by the LIDAR sensor. In this case, a transformation from the camera coordinate system (KKS) into the LIDAR coordinate system (LKS) takes place. Conversely, the image that was recorded by the LIDAR sensor can naturally also be converted into the coordinate system of the image that was recorded by the camera. In this case, a transformation from the LIDAR coordinate system (LKS) into the camera coordinate system (KKS) takes place.

In a third alternative, conversion values are determined based on the determined poses to convert future images into a common coordinate system (GKS) or to convert a future image from one sensor into the coordinate system of the other image and thus of the other sensor. Thus, a future image of the camera can be converted from the camera coordinate system (KKS) into the LIDAR coordinate system (LKS) based on conversion values. Alternatively thereto, a future image of the LIDAR sensor can be converted from the LIDAR coordinate system (LKS) into the camera coordinate system (KKS) based on conversion values.

It is particularly advantageous that a single calibration board can be used to determine the poses of the calibration board relative to the camera and relative to the LIDAR sensor. Thus, it is then possible to convert images that are recorded by the camera and/or the LIDAR sensor into the respective other coordinate system. If an object is detected in an image of the camera, it can immediately be said at which position in the image of the LIDAR sensor this object must be located. Nothing else also applies to an object in the image of the LIDAR sensor. It can immediately be said at which position in the image of the camera this object must be located.

It is understood that the calibration board can also merely comprise a painted wall. The calibration board is therefore not necessarily a separate structure that is placed in the room or hung on a wall.

Further advantages over the approaches known from the prior art are the increased robustness and the low time effort for the calibration, as is required for industrial applications. Since additional reflection regions are applied to the calibration board, very characteristic intensity features in the image, i.e. in the LIDAR data of the LIDAR sensor, can be used to recognize the calibration board. It follows from this that the calibration board is reliably recognized in almost any desired environment. With the purely geometric features described in the prior art, on the other hand, false detections during the position calibration can easily occur in any desired environments without the introduction of prior knowledge.

Furthermore, an easier alignment of the LIDAR sensor in the environment is possible. It is also more easily possible to diagnose errors in the image of the LIDAR sensor, i.e. in the LIDAR data. This makes it easier to say why the data do not look as expected at a specific position.

Furthermore, extensive object information is provided. The position in space of objects can be determined from the fused data (converted images of the different sensors). Even further properties can additionally be determined from the images of the camera using object recognition or code and character reading. For example, it can thus be distinguished whether the object in the image is a person or not a person. A unique identification via a QR code is likewise possible. This could lead to more efficient anti-collision solutions, e.g. a person has to be driven around more slowly and more carefully than a pallet. A documentation can additionally or alternatively be performed during palletizing tasks, e.g. by simultaneously identifying goods loaded by an automated guided vehicle. Furthermore, an improvement in object detection is achievable for anti-collision solutions. In the image of the LIDAR sensor, i.e. in the LIDAR data, a small object, e.g. a fork of a forklift, could be detected by only one or a few points. With the help of the images of the camera, i.e. the camera data, it could then be deduced whether this is a malfunction or a relevant object for which there is a risk of collision.

In a further development of the method for position calibration, the camera and the LIDAR sensor are arranged in fixed positions relative to one another. This means that the distance and the alignment between the camera and the LIDAR sensor remains the same, i.e. constant. Nevertheless, it is possible for the camera and the LIDAR sensor to be moved together. For example, they can be fastened together on a vehicle that is, for example, being moved autonomously. The distance and the alignment between the camera and the LIDAR sensor then corresponds to the distance and alignment between the camera and the LIDAR sensor in later operation.

In a further development of the method for position calibration, the camera and the LIDAR sensor record the respective image simultaneously. This means that the same scene will be recorded. A time offset between the recording of the different images is in this respect preferably smaller than 1 second, 500 ms, 200 ms, 100 ms, 50 ms, 20 ms, 10 ms or smaller than 1 ms. To be able to achieve a minimal time offset, provision can be made that the respective image of the camera and of the LIDAR sensor have a time stamp, wherein, based on time information of the time stamp, it can be said which images of the LIDAR sensor and the camera have been recorded “simultaneously”. The smallest possible time offset is achieved by synchronizing local timers of the LIDAR sensor and the camera with an external timer or by providing the time signal of an external timer directly to the LIDAR sensor and the camera. By sorting the images of the LIDAR sensor and the camera based on their time stamps, as small as possible a time offset can then be achieved.

In a further development of the method for position calibration, the additional reflection regions comprise reflection strips. These are preferably glued onto the calibration board.

In a further development of the method for position calibration, the additional reflection regions, i.e. in particular in the form of the reflection strips, are oriented at an angle to one another. Therefore, the reflection regions are in particular not all aligned in parallel with one another since otherwise a unique identification of the pose between the calibration board and the LIDAR sensor by means of laser lines, which are transmitted by the LIDAR sensor in the form of the laser light, would not be possible.

In a further development of the method for position calibration, the known patterns comprise ChArUco patterns. With such patterns, both an intrinsic calibration, such as estimating and correcting the lens distortion, focal length and/or focal point of the camera, and an extrinsic calibration, such as determining the pose of the calibration board in the camera coordinate system, can take place. This procedure has, for example, been described by Garrido-Jurado, S., Mu-Salinas, R., Madrid-Cuevas, F., and Mar Jim z, M. (2014). “Automatic generation and detection of highly reliable fiducial markers under occlusion.” Pattern Recogn. 47, 6 (June 2014), 2280-2292. The open source library “opencv cameria calibration (2022)” can be used for this purpose. Opencv camera calibration (2022). “Camera calibration with opencv, <https://docs.opencv.org/4.x/d4/d94/tutorial_camera_calibration.html>.

The intrinsic camera calibration is in particular determined directly from the recordings of the camera. This makes the use much easier in practice since the camera does not have to be calibrated beforehand. Thus, cameras from other manufacturers can e.g. be easily introduced into the process. A camera calibration, which must be performed in advance, always has the risk that in the period between the intrinsic calibration of the camera and the registration of the LIDAR sensor against the camera, the optical properties of the camera system have changed (e.g. due to vibration, focus adjustment and thermal expansion). Since the calibration board is small compared to the size of typical measuring rooms, the calibration board could also permanently remain in the measuring room in order to regularly check the measurement parameters through a re-recording of the calibration board by the LIDAR sensor and the camera (quality assurance).

It is particularly advantageous that a single calibration board is used to determine all the calibration steps (camera: intrinsic and extrinsic, LIDAR sensor: extrinsic). A direct relationship between the laser-related measurement ranges (reflection ranges) and the camera-related measurement ranges (ChArUco patterns) is thereby established directly via the calibration board. This increases the robustness of the method and avoids setup errors compared to other methods in which an intrinsic and extrinsic calibration take place separately. Finally, the spatially compact design of the calibration board is suitable for use in industrial environments where the available space can be limited or some regions can be difficult to access so that setting up complex calibration apparatus would be impossible.

In a further development of the method for position calibration, a localization of the known patterns on the calibration board takes place in a method step. In a further method step, the intrinsic parameters of the camera, in particular the focal length, focal point and/or lens distortion, are determined based on the known patterns. A calibration of the camera using the intrinsic parameters subsequently takes place. Therefore, the camera does not already have to be calibrated. This facilitates the use in practice immensely.

In a further development of the method for position calibration, a plurality of images are used to determine the intrinsic parameters of the camera. Those images in which the projection error exceeds a threshold value are discarded in this respect. To determine the intrinsic parameters, the camera records images of the same scene. The relative position between the camera and the calibration board is preferably unchanged. Nevertheless, it is also conceivable that the position or the alignment of the calibration board and/or the camera has changed for at least two of the images or for all of the images. A certain number of images is preferably also recorded by the camera, wherein this number exceeds a further threshold value. Further preferably, at least 2, 3, 6, 8, 12, 16, 20 or more than 25 images are used.

In a further development of the method for position calibration, the calibration board is placed such that it lies completely in the image of the camera and such that it is crossed by a plurality of laser lines, i.e. scan lines of the LIDAR sensor. It would generally be conceivable that the method is not limited to a LIDAR sensor that generates a certain number of laser lines, such as 4. It thus also allows the use of LIDAR sensors with diverse point distribution characteristics, such as single-plane LIDAR sensors, or LIDAR sensors with pseudo-random point distributions.

In a further development of the method for position calibration, the LIDAR sensor generates more than 2, 3, 4 or more than 5 laser lines. These laser lines preferably extend in parallel with one another and are further preferably generated simultaneously. A very accurate determination of the pose, i.e. of the position and alignment of the calibration board with respect to the LIDAR sensor, is thereby possible since different laser lines cross different reflection regions. In particular in the case that the reflection regions are oriented at an angle to one another, the pose of the calibration board relative to the LIDAR sensor can be determined very accurately.

In a further development of the method for position calibration, a curvature of the laser lines is compensated by a known or calculated deviation from a straight laser line. Strictly speaking, the laser line which the LIDAR sensor projects onto the calibration board is not a straight line, but a flat-curved hyperbola. The deviation from a straight line is not too great, but it is still possible to consider the curvature of the hyperbola. This can inter alia be achieved by taking the deviation from a straight laser line from a lookup table. The lookup table is calculated and stored once for each laser line.

In a further development of the method for position calibration, it is determined in a method step which sections of the reflected laser lines have an intensity development that lies above a threshold value and which sections of the reflected laser lines lie in a plane. Sections above the threshold value are regions of high reflectivity. Thus, a binarization of the intensity development is performed. All the additional reflection regions on the calibration board lie in one plane. Such an image must also result in the case of the reflected laser lines. Points in space (e.g. X, Y, Z) are determined for the reflected laser lines and a corresponding intensity value is also determined for each point. Furthermore, the reflectivity of the additional reflection regions is higher than the environment. In a further method step, the sections determined in this way are compared with respect to the known additional reflection regions. It is known, or it has been determined from the at least one image of the camera, where the additional reflection regions are located on the calibration board. The calibration board can thereby be detected in the image of the LIDAR sensor.

In a further development of the method for position calibration, the comparison takes place by determining a displacement and a rotation angle of the determined sections relative to the origin of the calibration board in order thus to determine the pose of the calibration board relative to the LIDAR sensor. Thus, the reflected laser lines can, for example, be shifted in the plane until the regions of the reflected laser lines whose intensity values are above a threshold value correspond to the regions on the calibration board at which the additional reflection regions are arranged. This can take place via an iterative process in which a rotation of the reflected laser lines also takes place.

In a further development of the method for position calibration, data from at least one radar sensor could also be included. In this case, the calibration board could also comprise radar reflectors. These radar reflectors can be active or passive radar reflectors.

In a further development of the method for position calibration, a plurality of images are preferably created by the camera and/or by the LIDAR sensor. The camera and the LIDAR sensor are preferably arranged in fixed positions. The position and the alignment between the camera and the LIDAR sensor is also fixed and is not changed. The calibration board can then be moved while various images are recorded by the camera and the LIDAR sensor. Alternatively, the calibration board can be arranged in a fixed position. In this case, an assembly of the camera and the LIDAR sensor can move, wherein the position and the alignment between the camera and the LIDAR sensor remain unchanged. The alignment between the calibration board and the camera/LIDAR sensor thereby differs in the individual images.

In a further development of the method for position calibration, further test calibration boards can be set up. The position calibration can be checked by these test calibration boards.

In a further development of the method for position calibration, the LIDAR sensor can comprise an azimuth detection field of more than 120°, 180°, or more than 240°. The azimuth detection field can also amount to 360°. Furthermore, at least one further camera and at least one further calibration board are used. More than one additional camera could also be used. In this case, all the cameras could thereby be matched against the LIDAR sensor. The method would then allow all the images to be converted into a common coordinate system based on the determined poses. It would also be conceivable for the images from at least two but not all the sensors to be converted into the coordinate system of the remaining sensor (e.g. the LIDAR sensor). It would generally also be possible that conversion values could likewise be determined in this case to convert future images into a common coordinate system. It would also be possible that conversion values could be determined to convert a future image into the coordinate system of another future image of another sensor.

In a further development of the method for position calibration, the pose of the calibration board relative to the LIDAR sensor could also be optimized by additional prior knowledge. Thus, a Monte Carlo search can be used to determine the desired pose. The search space can then be significantly restricted based on the pose of the calibration board relative to the camera determined as part of the extrinsic camera calibration. This is based on the assumption that the LIDAR sensor and the camera are located close to one another or that their position relative to one another is roughly known. However, this is not a mandatory restriction and only reduces the search effort in the parameter space. The remaining free parameters are essentially limited to the angle of deviation from the horizontal of the at least one laser line sweeping the calibration board and to the height of said angle of deviation on the calibration board. As an optimization criterion, a distance measure, such as the Hamming distance, is then to be used that indicates the distance between the detected intensity values of the reflected laser light that lie above a threshold value and the position of the additional reflection regions that is predicted by means of the current transformation.

In a further development of the method, a position and/or the alignment of the calibration board relative to an assembly of the camera and the LIDAR sensor can be changed. In this respect, the calibration board is preferably moved around the assembly of the camera and the LIDAR sensor. However, the assembly of the camera and the LIDAR sensor could also be moved around the calibration board. The distance and the alignment between the camera and the LIDAR sensor remains unchanged. The camera and the LIDAR sensor then record images again and the pose of the calibration board relative to the camera and to the LIDAR sensor is determined again. More accurate conversion values can thereby e.g. be determined.

The position calibration system according to the invention comprises a camera, a LIDAR sensor, a calibration board, and a processing unit. The calibration board has known patterns, wherein the known patterns comprise different brightnesses. Additional reflection regions are applied to the calibration board that have a higher reflectivity than the known patterns of different brightness. The camera is configured to record an image of the calibration board, wherein the processing unit is configured to determine a pose of the calibration board relative to the camera based on the known patterns. These known patterns are recorded in the image of the camera in this respect. The LIDAR sensor is configured to transmit a laser light to the calibration board. The LIDAR sensor is furthermore configured to record an image, wherein the processing unit is configured to determine regions of high reflectivity based on intensity values of the laser light reflected by the calibration board. The processing unit is configured to convert both images into a common coordinate system (GKS) based on the determined poses. Alternatively, the processing unit is configured to convert an image into the coordinate system of the other image based on the determined poses; alternatively, the processing unit is configured to determine conversion values based on the determined poses to convert future images into a common coordinate system (GKS) or to convert a future image from one sensor (camera or LIDAR sensor) into the coordinate system of another future image of the other sensor (LIDAR sensor or camera). Provision can be made to transform the LIDAR data into a 2D image coordinate system. The position of at least some pixels in the 2D image coordinate system could also be transformed into the 3D system.

Furthermore, an autonomously driving vehicle, in particular in the form of a forklift truck, is also specified. The autonomously driving vehicle comprises a camera, a LIDAR sensor, and a processing unit. The camera and the LIDAR sensor are calibrated with respect to one another in accordance with any one of the preceding claims and are arranged relatively non-displaceably with respect to one another at the vehicle. The LIDAR sensor is configured to continuously monitor the road, in particular in front of the vehicle, for obstacles. The processing unit is configured to compare at least one object in the data (images) of the LIDAR sensor that is e.g. smaller than a threshold value with the data of the camera in order, in the event that the object poses a risk of collision, to brake the vehicle and/or to initiate a steering movement in order to avoid a collision and/or to issue a warning or, in the event that the object does not pose a risk of collision, not to intervene in the driving movement of the vehicle and/or not to issue a warning. The warning can take place visually and/or acoustically and/or haptically, e.g. by vibrations.

Figure 2:
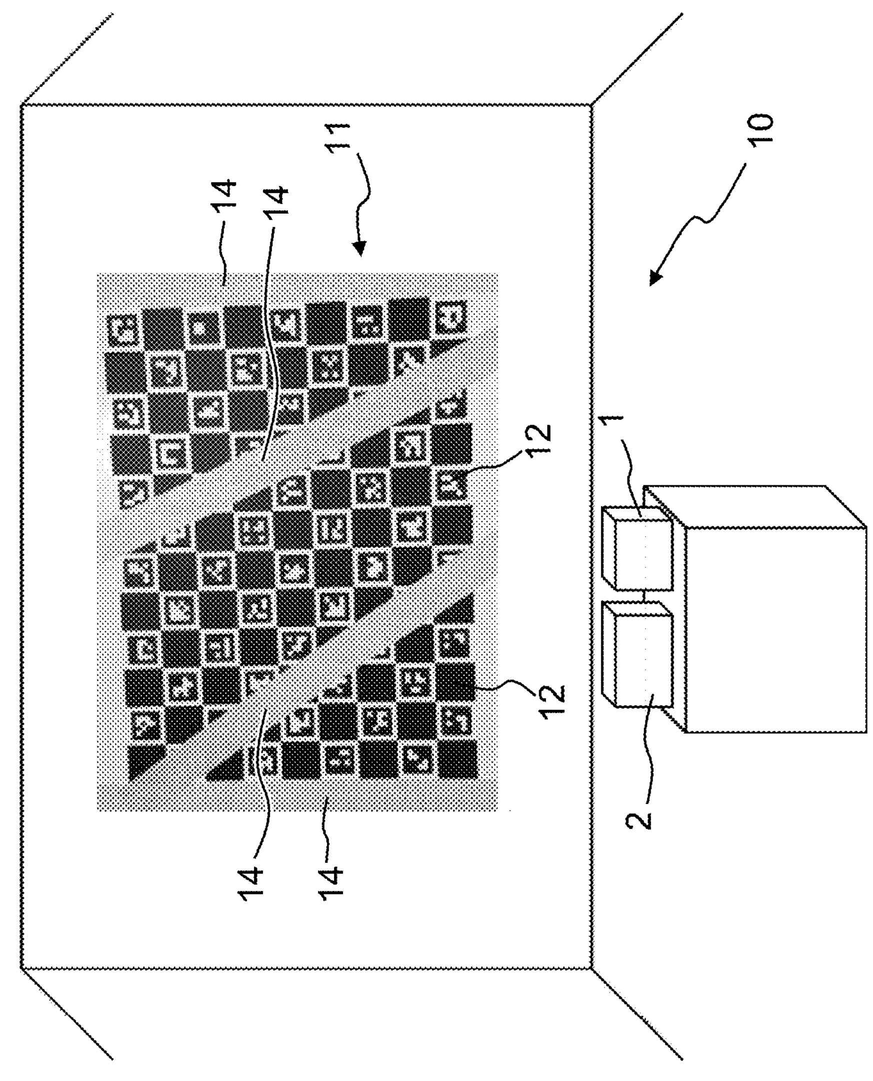
Figure 3:
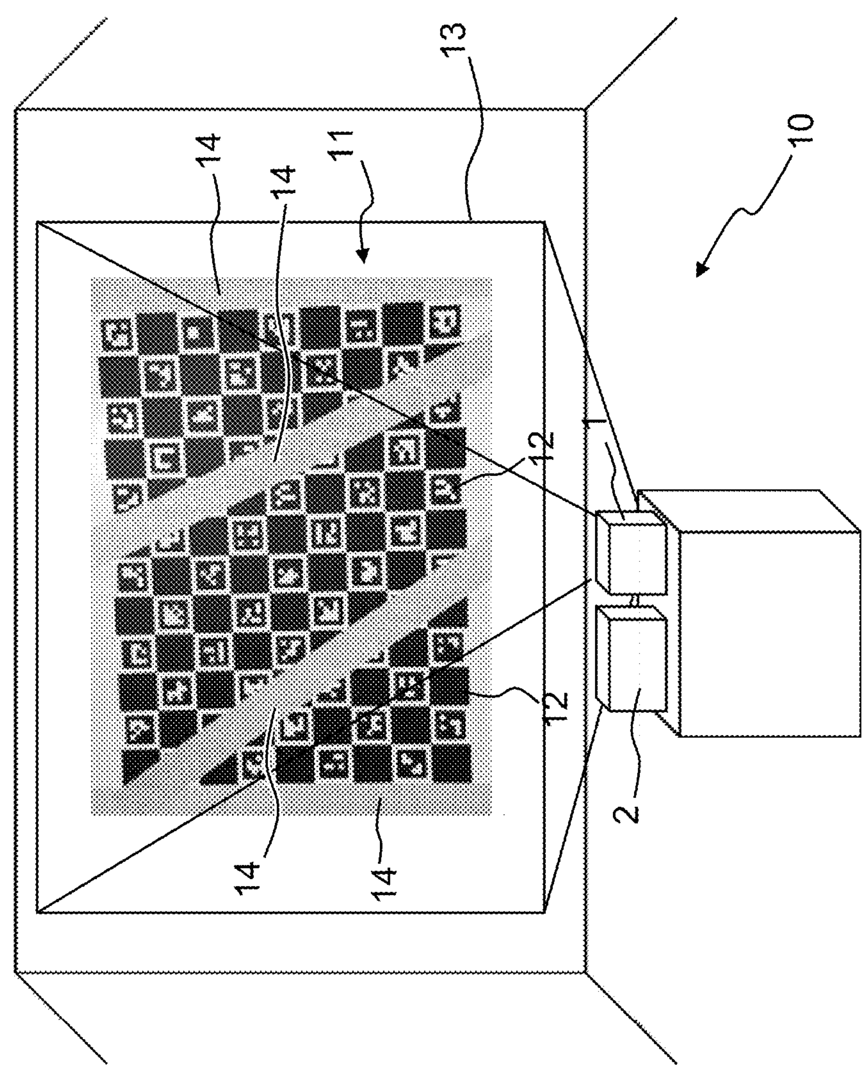
Figure 4:
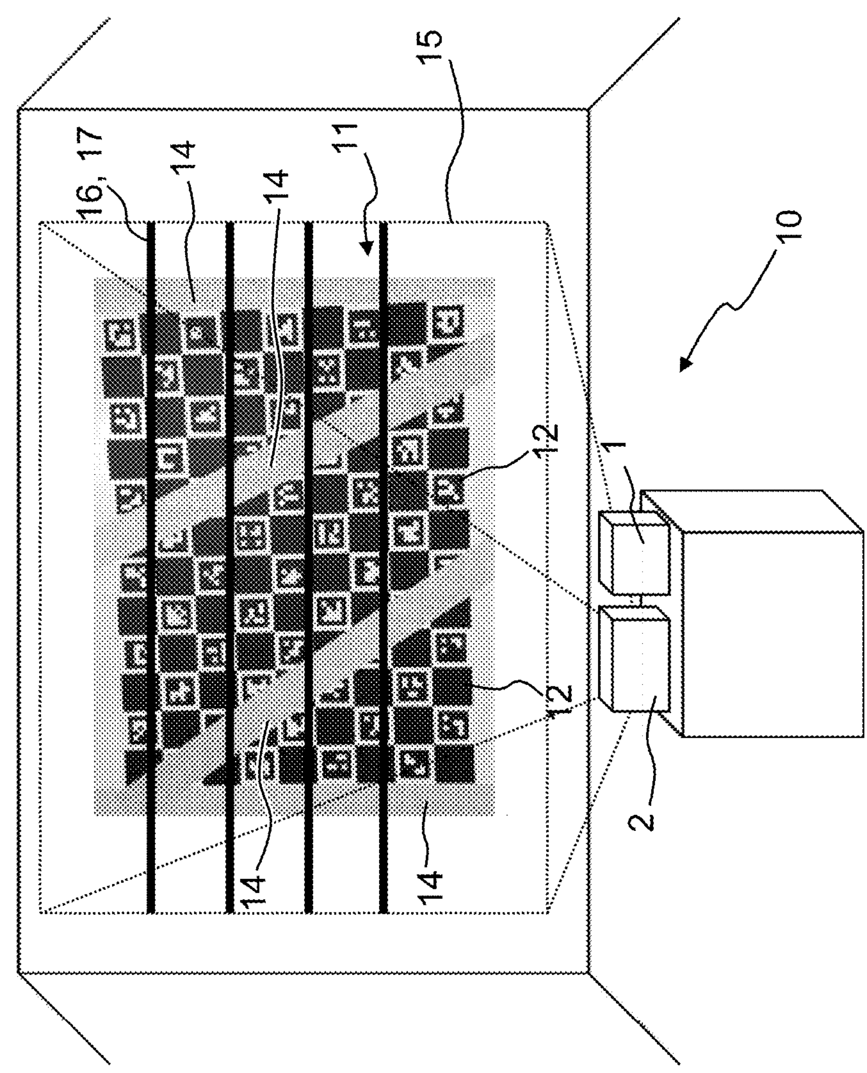
Figure 5:
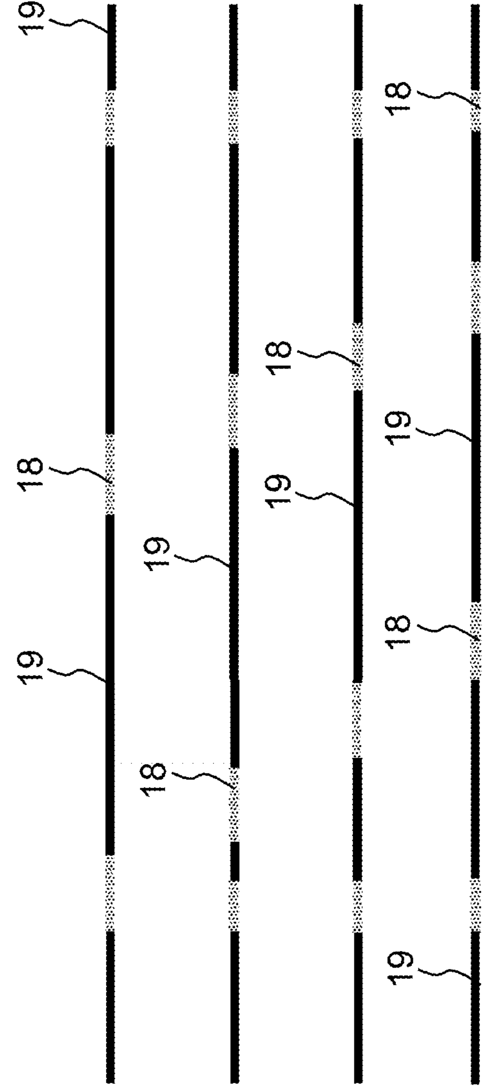
Figure 6:
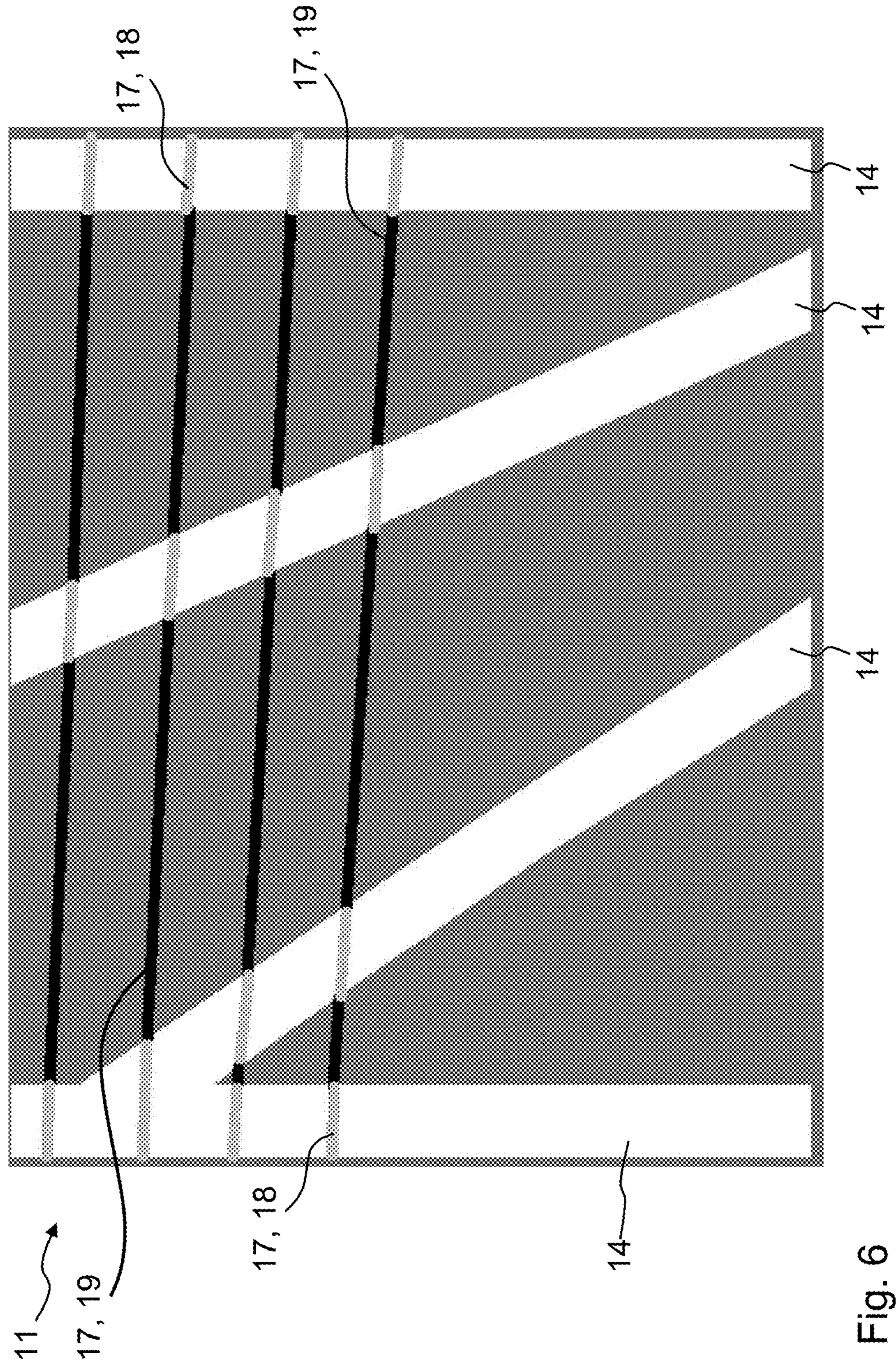
Figure 7:
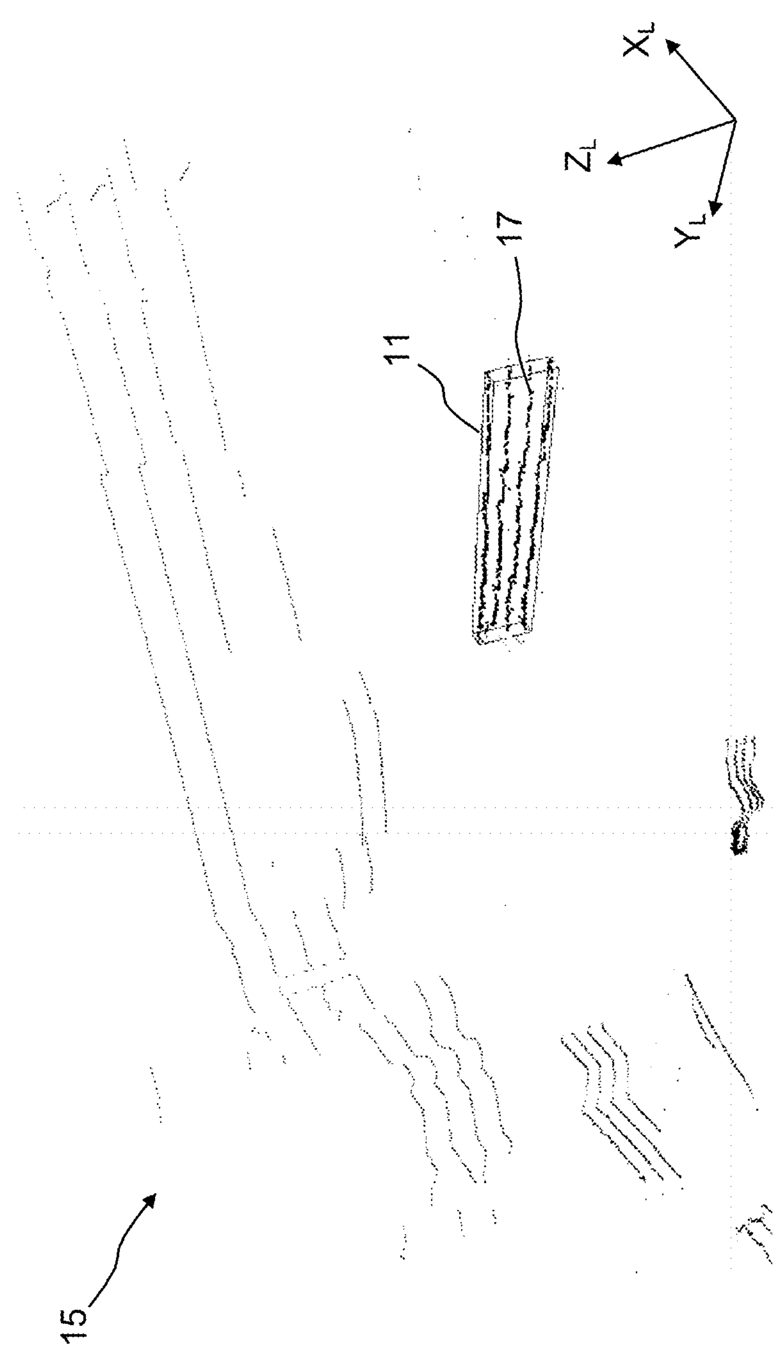
Figure 8:
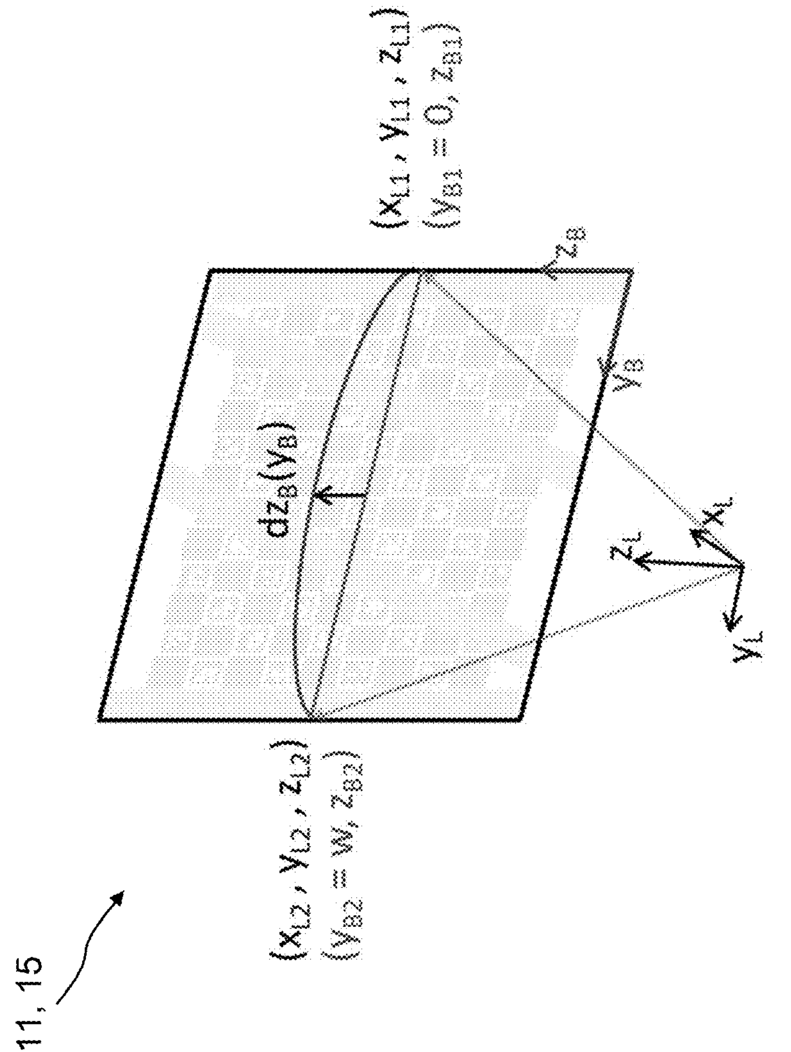
Figure 9:
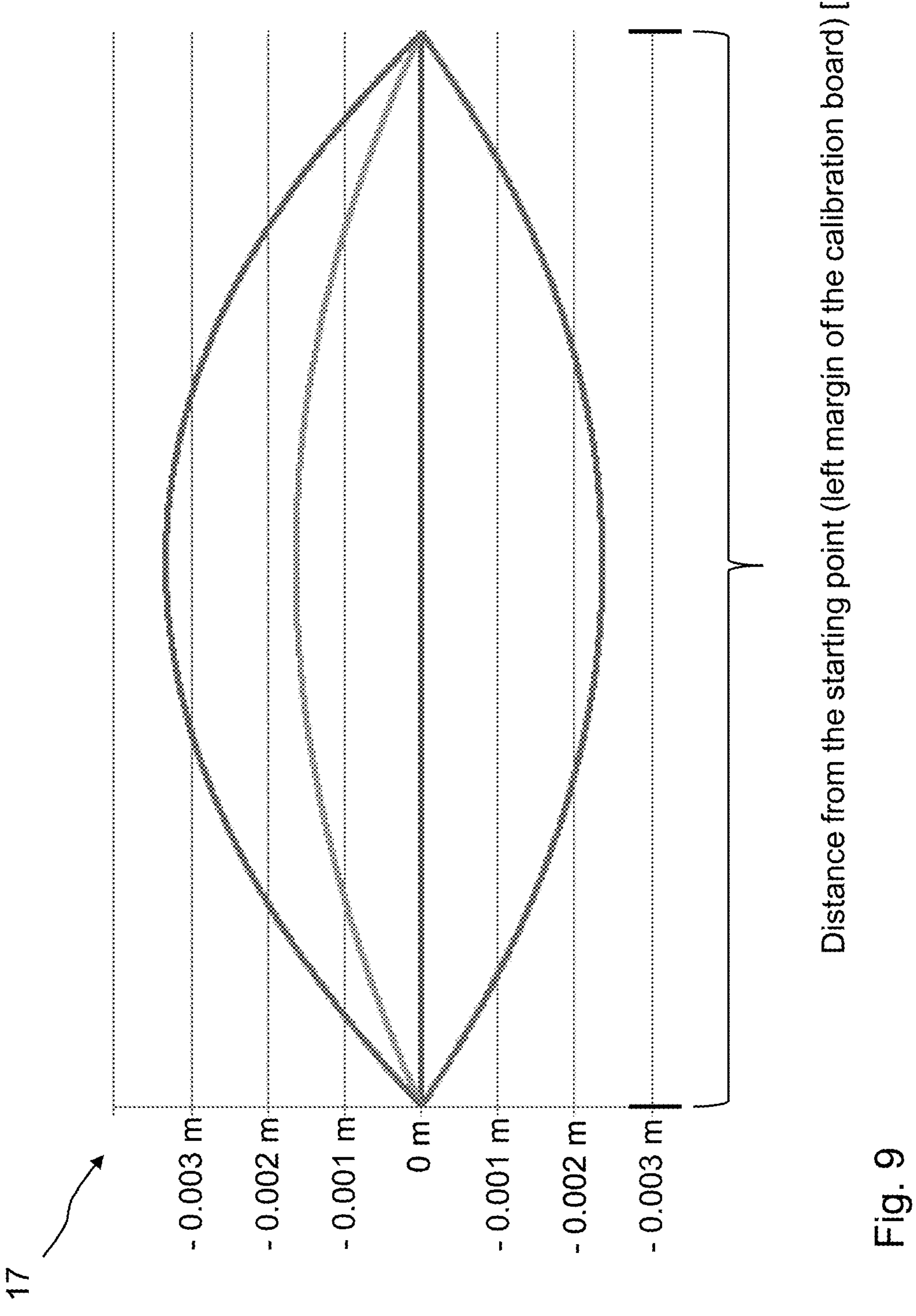
Figures 10A, 10B:
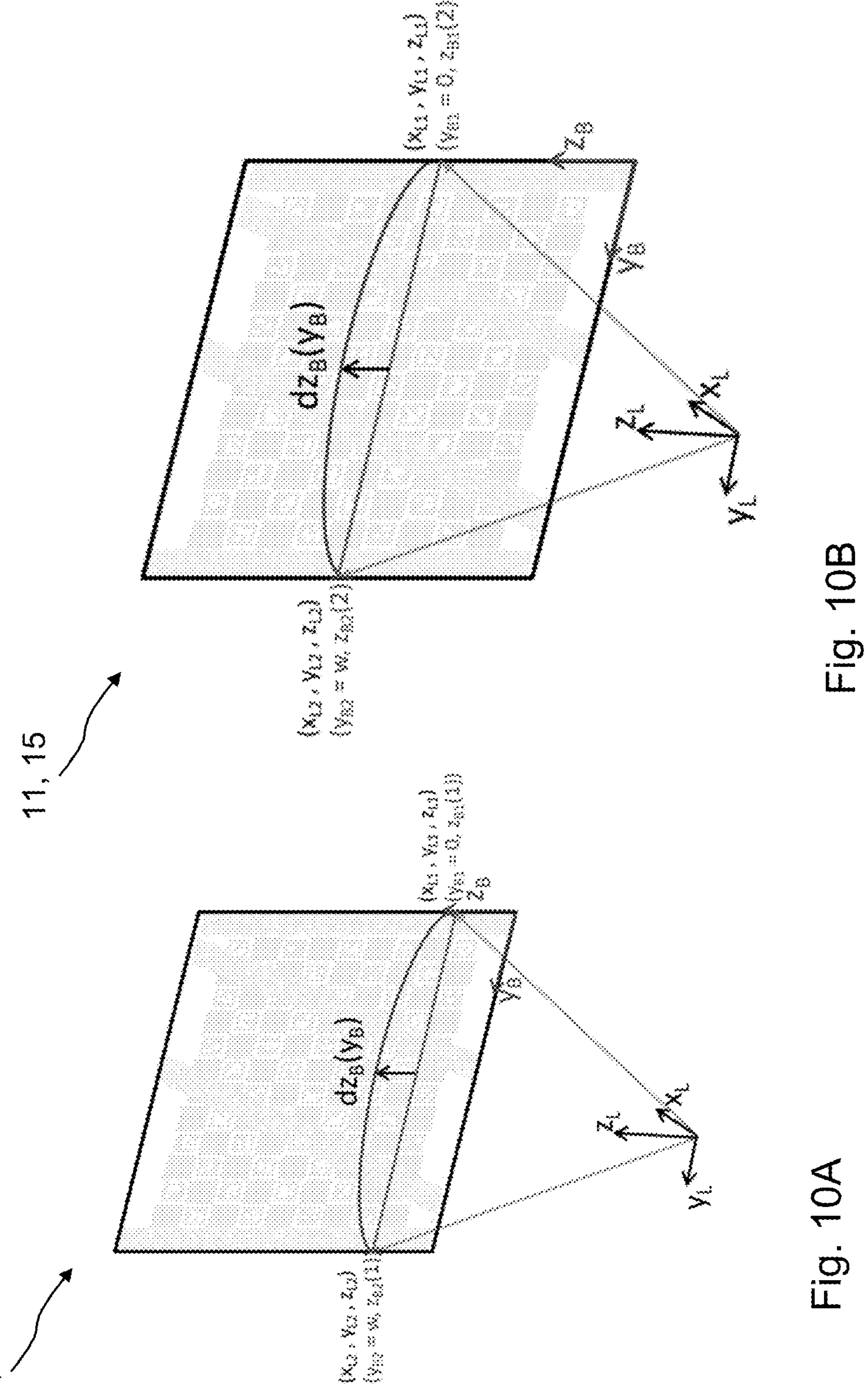
Figure 11:
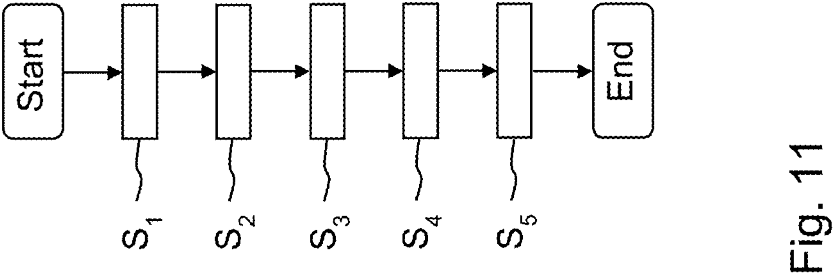
Figure 10C:
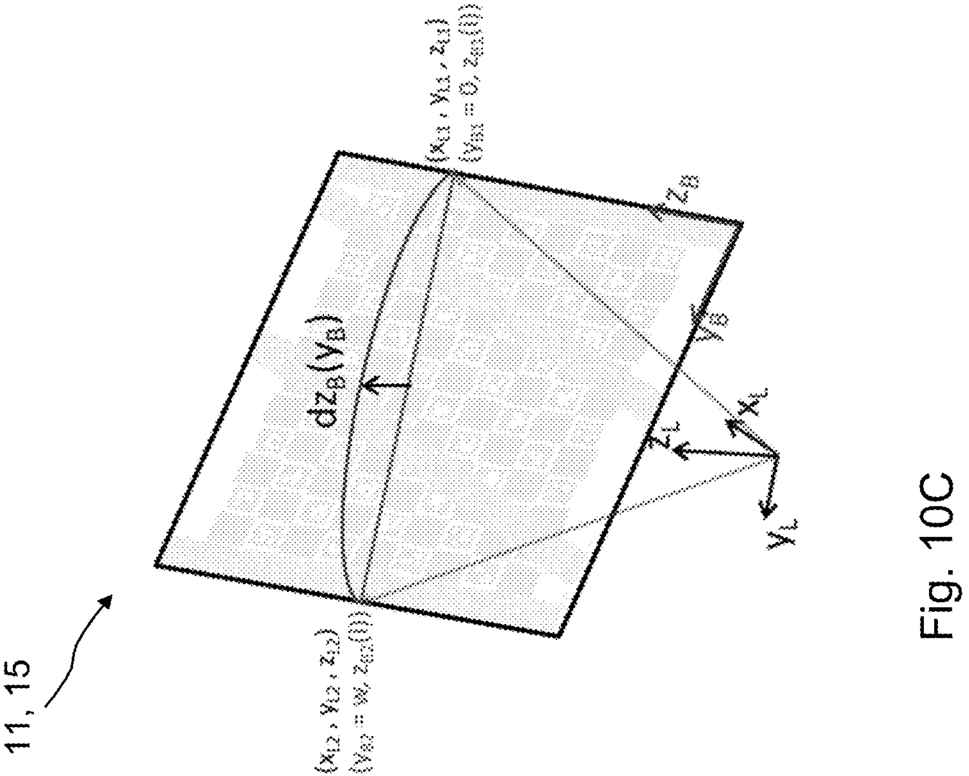

The invention will be described purely by way of example with reference to the drawings in the following. There are shown:

FIG. 1: an embodiment with a camera and a LIDAR sensor that monitor a spatial region in a production environment;

FIGS. 2, 3, 4: a position calibration system with the camera, the LIDAR sensor and a calibration board;

FIG. 5: a course of laser light that was reflected by the calibration board, wherein different portions of the laser light have different intensity values;

FIG. 6: a possibility that describes how the sections of FIG. 5 are compared with additional reflection regions on the calibration board;

FIG. 7: an image of a LIDAR sensor in which the calibration board is located;

FIGS. 8, 9: embodiments that illustrate that the laser line of the LIDAR sensor is not a straight line, but a flat curved hyperbola;

FIGS. 10A, 10B, 10C: embodiments that explain how the pose of the calibration board relative to the LIDAR sensor is determined; and FIG. 11: a flow chart that describes a method for position calibration of a camera and a LIDAR sensor using a calibration board.

FIG. 1 shows the use of a camera 1 and a LIDAR sensor 2 that together monitor a spatial region 3 of a production environment. In the production environment, a robot 4 is shown in this case. To prevent people from inadvertently entering the movement region of the robot 4, the spatial region 3 in which the robot 4 is located is monitored by the camera 1 and the LIDAR sensor 2. In this embodiment, the camera 1 and the LIDAR sensor 2 are arranged in a common housing 5. However, they can also be accommodated in different housings. Both the camera 1 and the LIDAR sensor 2 have a monitored field 6. The monitored field 6 of the camera 1 is shown with a solid line, whereas the monitored field 6 of the LIDAR sensor 2 is shown with a dotted line. Both monitored fields 6 are aligned at least partly overlapping with one another. As will be explained later, the data of the camera 1 and the data of the LIDAR sensor 2 can be fused so that it can immediately be said at which position a detected object 7 in the data of the camera 1 must appear in the data of the LIDAR sensor 2, and vice versa. A much more efficient monitoring of the spatial region 3 is thereby possible. This fusion can take place using a processing unit 8 that is, for example, arranged in the common housing 5. In this case, the common housing 5 is attached to a wall 9.

The camera 1 can be a photo camera or a video camera.

A position calibration system 10 comprising the camera 1, the LIDAR sensor 2 and a calibration board 11 is shown in FIGS. 2, 3, 4. The calibration board 11 comprises known patterns 12 of different brightness. The known patterns 12 are preferably ChArUco patterns. They comprise a checkerboard structure having ArUco patterns. The patterns 12 themselves are known with respect to their size and alignment relative to one another.

The camera 1 and the LIDAR sensor 2 are arranged in fixed positions, i.e. they are arranged non-displaceably with respect to one another. This arrangement is maintained after the position calibration, i.e. when used in an autonomously driving vehicle.

In FIG. 3, it is shown that the camera 1 records an image 13 in which the calibration board 11 is located. Via the processing unit 8, it is possible to determine a pose of the calibration board 11 relative to the camera 1. This takes place by detecting the known patterns 12. The determination of the pose (position and orientation) of the calibration board 11 relative to the camera 1 is also referred to as extrinsic camera calibration. Furthermore, an intrinsic camera calibration can also be performed based on the recorded image 13. In particular the focal length, focal point and/or lens distortion are determined in this respect. This takes place based on the detected known patterns 12. Therefore, the camera 1 does not already have to be pre-calibrated.

The assembly consisting of the camera 1 and the LIDAR sensor 2 is preferably moved around the calibration board 11 so that a plurality of images 13 are recorded by the camera 1 from different angles of view of the calibration board 11. The calibration board 11 could naturally also be moved in addition or alternatively thereto.

In FIGS. 2, 3, and 4, it is furthermore shown that the calibration board 11 comprises additional reflection regions 14 that have a higher reflectivity than the known patterns 12. These additional reflection regions 14 in particular comprise a plurality of reflection strips. The reflection strips are at least partly oriented at an angle to one another. The known patterns 12 can be partly covered, for example pasted over, by the additional reflection regions 14.

In FIG. 4, it is shown that the LIDAR sensor 2 records an image 15 in which the calibration board 11 is located. This is done by transmitting laser light 16, in particular in the form of a plurality of laser lines 17. The reflected laser light 16 in the form of the laser lines 17 is visible in the recorded image 15 of the LIDAR sensor 2. In the recorded image 15 of the LIDAR sensor 2, regions 18 (see FIG. 5) of high reflectivity can be determined. This takes place based on intensity values of the laser light 16 reflected by the calibration board 11. The processing unit 8 is configured to determine a pose of the calibration board 11 relative to the LIDAR sensor 2 based on the known reflection regions 14 and the determined regions 18 of high reflectivity.

The assembly consisting of the camera 1 and the LIDAR sensor 2 is preferably moved around the calibration board 11 so that a plurality of images 15 are recorded by the LIDAR sensor 2 from different angles of view of the calibration board 11. The calibration board 11 could naturally also be moved in addition or alternatively thereto.

The camera 1 and the LIDAR sensor 2 preferably record images 13, 15 of the calibration board 11 synchronously with one another.

A plurality of laser lines 17 of the LIDAR sensor 2 preferably cross the calibration board 11 and thus the additional reflection regions 14. Since the additional reflection regions 14 comprise reflection strips oriented at an angle to one another, which part of the calibration board 11 has been crossed by the laser lines 17 can be precisely determined based on the reflected laser light 16.

The LIDAR sensor 2 preferably transmits more than two, three, four or more than five laser lines 17 that are further preferably arranged in parallel with one another. The laser lines 17 are preferably arranged completely free of overlap with one another.

The processing unit 8 is furthermore configured to convert both images 13, 15 into a common coordinate system (GKS) based on the determined poses. In this case, it can be said quite precisely where an object 7 is located.

Alternatively thereto, the processing unit 8 is configured to convert one image 13, into the coordinate system of the other image 15, 13 based on the determined poses. Even then, it can be determined in which region of the other image 15, 13 the object 7 must be located.

The processing unit 8 is in particular additionally or alternatively configured to determine conversion values based on the determined poses to convert future images 13, 15 into a common coordinate system (GKS) using the conversion values. A future image 13, 15 can also be converted into the coordinate system of the other image 15, 13 using the conversion values. A fusion of both images 13, is thereby efficiently possible and detected objects 7 in one image 13, 15 can be verified by the other image 15, 13.

FIG. 5 shows a recorded image 15 of the LIDAR sensor 2. The image 15 includes the reflected laser light 16 that comprises the laser lines 17 and that was transmitted by the LIDAR sensor 2. In the image 15, there are regions of high reflectivity 18, i.e. regions having a high light intensity. These regions of high reflectivity 18 occur because the laser light 16, i.e. the laser lines 17 transmitted by the LIDAR sensor 2, is incident on the additional reflection regions 14 of the calibration board 11.

Furthermore, regions of low reflectivity 19 are also shown. In these regions, the intensity of the reflected laser light 16 is lower than in the regions of high reflectivity 18. The laser lines 17 transmitted by the LIDAR sensor 2 strike regions of the calibration board 11 that absorb a higher light power.

This is illustrated by means of another embodiment in FIG. 6. The additional reflection regions 14 are drawn in on the calibration board 11. The known patterns 12 have been omitted in this case for better clarity. Furthermore, the reflected laser light 16 is shown in the form of the laser lines 17. The reflected laser light 16 has an intensity development of different strengths depending on which regions of the calibration board the laser light 16 has impinged upon. Regions of a high reflectivity 18, i.e. a high intensity value, are shown brighter than regions of a low reflectivity 19. The processing unit 8 can analyze the image 15 of the LIDAR sensor 2 to determine in which region the calibration board 11 is located and how the calibration board 11 has to be oriented relative to the LIDAR sensor 2 so that the detected regions of high reflectivity 18 match the known additional reflection regions 14 of the calibration board 11. This will be explained even more precisely below.

FIG. 7 shows an image 15 of the LIDAR sensor 2 in which the calibration board 11 is located. The method described below is only intended to illustrate one possible example. The measurement data of the LIDAR sensor 2 are preferably transformed into Cartesian coordinates so that the 3D position in LIDAR coordinates and its intensity value are known for each measurement point. The image 15 of the LIDAR sensor 2 therefore comprises a large number of measurement points. The set of all the measurement points can also be called a point cloud. The calibration board 11 is now iteratively located in the point cloud. The measurement point $P_{max}$ with the highest intensity value is searched for. It is examined whether this point lies within a plane. The detection of such a plane in the point cloud takes place by means of known methods, e.g. by segmentation pcl segmentation (2022) of the PointCloudLibrary (PCL) pcl (2022). Starting from the selected measurement point $P_{max}$, this segmentation provides all the measurement points that lie in a plane with a predefined maximum distance. If the measurement point $P_{max}$ is located in a planar surface with the dimensions of the calibration board 11, the calibration board is found. Otherwise, the described procedure is repeated with the measurement point with the next-lower intensity value. Optionally, the search range can be restricted by specifying a 3D square to avoid errors caused by reflections or artifacts.

Thereafter, the intensity values of the measurement points disposed on the planar surface are binarized. The binarization takes place by means of an intensity histogram. The binarization threshold is determined such that the percentage share of bright points (intensities above the threshold) matches the reflective portion on the calibration board 11. The ratio of reflective to non-reflective points of the calibration board 11 is known and constant (width of the reflection strips of the additional reflection regions 14 relative to the width of the calibration board 11). Such a binarization of the LIDAR point cloud on the calibration board is e.g. shown in FIG. 5.

The binarized intensity values of the reflected laser light 16 in the form of the laser lines 17 are compared to the calibration pattern, i.e. to the known additional reflection regions 14 on the calibration board 11, and the intersection lines of the laser lines 17 on the calibration board 11 are thereby determined. The position and the rotation angle of the laser lines 17 relative to the origin of the calibration board 11 are thereby determined. The determination, for example, takes place by iteration over all permissible positions and/or by a search procedure such as a Monte Carlo search. The iterative approach takes place varying over the start and end points of the intersection lines and e.g. comprises the following possibilities:

a) For each intersection line, the Hamming distance between the binarized intensity values and the points of the binarized reference chart is calculated. The binarized reference chart is a distortion-free and rectified sample of the calibration board 11 that only distinguishes reflective points (additional reflection regions 14) from non-reflective points (remaining regions).

b) The intersection line with the smallest Hamming distance determines the position and the rotation angle of the laser lines 17 relative to the origin of the calibration board 11.

A development with binarized intensity values that are mapped onto a preferably binarized reference pattern is also shown in FIG. 6. One can recognize how the best match was determined by shifting and rotating the laser lines 17 in the reference pattern.

It is also noted that the LIDAR sensor 2 does not scan the space in a plane, but through a flat cone. The laser line 17 that is projected onto the calibration board 11 by the LIDAR sensor 2 is therefore not a straight line, but a flat curved hyperbola.

The hyperbolic projection of the laser line 17 and its difference from the straight line $d_{zB}(y_B)$ is shown in FIG. 8. In this regard:

the laser line 17 in 3D LIDAR coordinates $L_{scan}=(x_L, y_L, z_L)$ in [meters], its projection onto the 2D board coordinates $L_{proj}=(y_B, z_B)$ in [meters] and the cone $x^2L+y^2L=R^2z^2L$ is the calibration board 11 for a given width w. The parameter R parametrically describes the opening angle of the cone.

FIGS. 10A, 10B, and 10C show the iteration over a curved laser line by moving the start and end points. At the end of the iteration, the regions of high reflectivity 18 of the reflected laser light 16 in the form of the laser lines 17 lie completely or more than 90%, 95% or more than 98% above the additional reflection regions 14.

The curvature of the hyperbola is preferably also considered by taking the deviation from the straight laser line 17 from a lookup table, for example. The lookup table can be calculated and stored once for each laser line 17. FIG. 9 shows the deviation of the hyperbolas from the straight laser line 17 that is stored in the lookup table. The width of the graph approximately corresponds to the width of the calibration board 11 in this respect. The Figure is shown superelevated in the Y direction. Even if the deviations between the section hyperbola and an approximated section line are small, the consideration of the hyperbola section increases the imaging accuracy. In the lookup table, the difference $dz_B(y_B)$ from the straight laser line 17 is stored for each value $y_B$. The values $d_{zB}(y_B)$ can be calculated as follows in this respect:

$$x_L = x_{L1} + \frac{y_{B_{px}}}{w_{px}}(x_{L2} - x_{L1}) \tag{1}$$

$$y_L = y_{L1} + \frac{y_{B_{px}}}{w_{px}}(y_{L2} - y_{L1}) \tag{2}$$

$$z_{L1} = \frac{1}{R}\sqrt{x_{L1}^2 + y_{L1}^2} \tag{3}$$

$$z_{L2} = \frac{1}{R}\sqrt{x_{L2}^2 + y_{L2}^2} \tag{4}$$

$$z_L = \frac{1}{R}\sqrt{x_L^2 + y_L^2} \tag{5}$$

$$dz_B(y_B) = z_L - \left(\frac{y_{B_{px}}}{w_{px}}(z_{L2} - z_{L1}) + z_{L1}\right) \tag{6}$$

Now, the following is known:

the position and orientation (pose) of the calibration board 11 in camera coordinates;

the measurement points of the laser lines 17 in LIDAR coordinates; and the position of the laser lines 17 relative to the origin of the calibration board 11 and thus the pose of the calibration board 11 relative to the LIDAR sensor 2.

Thus, for each measurement point $P_{Lidar}$ in 3D LIDAR coordinates that is located on the calibration board, a corresponding point in 3D camera coordinates can be specified. A transformation $T_{Lidar \rightarrow Board}$ can be specified with which a measurement point $P_{Lidar}=(x_{Lidar}, y_{Lidar}, z_{Lidar})$ can be mapped onto a point on the calibration board 11 $P_{Board}=(y_{Board}, z_{Board})$ (in the board reference system). Since the pose of the calibration board 11 in the camera coordinate system is also known, a transformation $T_{Board \rightarrow Camera}$ can furthermore be calculated. Thus, the point $P_{Board}=(y_{Board},$ $z_{Board}$) can be mapped onto a measurement point $P_{Camera}=(x_{camera}, y_{camera}, z_{Camera})$ in the camera coordinate system. From these point correspondences, a transformation $T_{Lidar \rightarrow Camera}$ can be estimated by known methods (least-mean-square), said transformation mapping each measurement point in LIDAR coordinates into a 3D point in camera coordinates (i.e. no longer just the points located on the calibration board). The estimation of the 3D transformation can e.g. take place as described in opencv pose estimation (see opencv pose estimation (2022)). Using the determined intrinsic camera parameters, the 3D camera points can be transformed into 2D image points. The determination and application of this transformation $T_{CameraIntrinsic}$, for example, takes place by known methods such as in opencv projection (see opencv projection (2022)). By concatenating the transformations $T_{Lidar \rightarrow Camera}$ and $T_{CameraIntrinsic}$, the measurement points of the LIDAR point cloud can now be transformed into the respective current image 13 of the camera 1 and the desired assignment of 3D LIDAR points to 2D image points is possible.

FIG. 11 shows a flow chart that describes a method for position calibration of the camera 1 and the LIDAR sensor 2 using the calibration board 11.

In a first method step $S_1$, at least one image 13 of the calibration board 11 is recorded by the camera 1 and a pose of the calibration board 11 relative to the camera 1 is determined based on the known patterns 12 on the calibration board 11.

In a second method step $S_2$, laser light 16, in particular in the form of laser lines 17, is radiated by the LIDAR sensor 2 onto the calibration board 11.

In a third method step $S_3$, an image 15 of the calibration board 11 is recorded by the LIDAR sensor 2 and regions of high reflectivity 18 are determined based on intensity values of the laser light 16 reflected by the calibration board 11, in particular in the form of the laser lines 17.

In a fourth method step S4, a pose of the calibration board 11 relative to the LIDAR sensor 2 is determined based on the known additional reflection regions 14 and the determined regions of high reflectivity 18.

In a fifth method step S5, in a first alternative, both images 13, 15 can be converted into a common coordinate system (GKS) based on the determined poses. In a second alternative, one image 13, 15 can be converted into the coordinate system of the other image 15, 13 based on the determined poses. Thus, an image 13 of the camera 1 can be converted into the LIDAR coordinate system (LKS) of the LIDAR sensor 2. Alternatively, an image 15 of the LIDAR sensor 2 can be converted into the camera coordinate system (KKS) of the camera 1. In a third alternative, conversion values are determined based on the determined poses to convert future images 13, 15 into a common coordinate system (GKS) or to convert a future image 13, 15 into the coordinate system of another future image 15, 13.

The invention is not restricted to the embodiments described. Within the scope of the invention, all the described and/or drawn features can be combined with one another in any desired manner. In particular, it is clear that the possibilities described for transformation are merely exemplary and that, mathematically, other solution possibilities also exist.

REFERENCE NUMERAL LIST camera 1
LIDAR sensor 2
spatial region 3
robot 4
housing 5
monitored field 6
object 7
processing unit 8
wall 9
position calibration system 10
calibration board 11
known patterns 12
Image of camera 13
additional reflection regions 14
Image of LIDAR sensor 15
laser light 16
laser lines 17
regions of high reflectivity 18
regions of low reflectivity 19
method steps $S_1$, $S_2$, $S_3$

The invention claimed is:

1. A method for position calibration of a camera and a LIDAR sensor using a calibration board, wherein the calibration board comprises known patterns, wherein the known patterns have different brightnesses and wherein additional reflection regions are present on the calibration board that have a higher reflectivity than the known patterns of different brightness, wherein the method comprises the following method steps:

recording at least one image of the calibration board with the camera and determining a pose of the calibration board relative to the camera based on the known patterns;

transmitting a laser light from the LIDAR sensor to the calibration board;

recording at least one image with the LIDAR sensor and determining regions of high reflectivity based on intensity values of the laser light reflected by the calibration board;

determining a pose of the calibration board relative to the LIDAR sensor based on the known additional reflection regions and the determined regions of high reflectivity;

and the following method step:

a) converting both images into a common coordinate system based on the determined poses; or b) converting one image into the coordinate system of the other image based on the determined poses;

and/or (c) determining conversion values based on the determined poses to convert future images into a common coordinate system or to convert a future image into the coordinate system of another future image.

2. The method for position calibration according to claim 1, wherein the camera and the LIDAR sensor are arranged in fixed positions relative to one another.

3. The method for position calibration according to claim 1, wherein the camera and the LIDAR sensor simultaneously record the respective image.

4. The method for position calibration according to claim 1, wherein the additional reflection regions comprise reflection strips.

5. The method for position calibration according to claim 1, wherein the additional reflection regions are oriented at an angle to one another.

6. The method for position calibration according to claim 4, wherein the reflection strips are oriented at an angle to one another.

7. The method for position calibration according to claim 1, wherein the known patterns comprise ChArUco patterns.

8. The method for position calibration according to claim 1, wherein the method comprises the following method steps:

locating the known patterns on the calibration board;

determining the intrinsic parameters based on the known patterns;

calibrating the camera by means of the intrinsic parameters of the camera.

9. The method for position calibration according to claim 8, wherein the intrinsic parameters comprise the focal length, focal point and/or lens distortion of the camera.

10. The method for position calibration according to claim 8, wherein the method comprises the following method step:

using a plurality of images to determine the intrinsic parameters of the camera, wherein those images are discarded in which the projection error exceeds a threshold value.

11. The method for position calibration according to claim 1, wherein the method comprises the following method step:

placing the calibration board such that it lies completely in the image of the camera and such that it is crossed by a plurality of scan lines of the LIDAR sensor.

12. The method for position calibration according to claim 1, wherein the plurality of scan lines is a plurality of laser lines.

13. The method for position calibration according to claim 1, wherein the laser light comprises more than two, three, four or more than five laser lines that are arranged spaced apart from one another.

14. The method for position calibration according to claim 13, wherein the method comprises the following method step:

compensating a curvature of the laser lines by a known or calculated deviation from a straight line.

15. The method for position calibration according to claim 13, wherein the method comprises the following method steps:

determining which sections of the reflected laser lines:

a) have an intensity development that lies above a threshold value;

b) that lie in one plane;

comparing the determined sections with respect to the known additional reflection regions.

16. The method for position calibration according to claim 15, wherein the method step comparing comprises the following sub-method step:

determining a displacement and a rotation angle of the determined sections relative to the origin of the calibration board in order thus to determine the pose of the calibration board relative to the LIDAR sensor.

17. The method for position calibration according to claim 1, wherein the method comprises the following method steps:

changing the position and/or the alignment of the calibration board relative to an assembly of the camera and the LIDAR sensor and repeating at least the method steps recording, transmitting, recording and determining.

18. A position calibration system comprising a camera, a LIDAR sensor, a calibration board, and a processing unit, wherein the calibration board comprises known patterns, wherein the known patterns have different brightnesses and wherein additional reflection regions are present on the calibration board that have a higher reflectivity than the known patterns of different brightness and wherein:

the camera is configured to record at least one image of the calibration board and wherein the processing unit is configured to determine a pose of the calibration board relative to the camera based on the known patterns;

the LIDAR sensor is configured to transmit a laser light to the calibration board;

the LIDAR sensor is configured to record at least one image and wherein the processing unit is configured to determine regions of high reflectivity based on intensity values of the laser light reflected by the calibration board;

the processing unit is configured to determine the pose of the calibration board relative to the LIDAR sensor based on the known additional reflection regions and the determined regions of high reflectivity;

and wherein the processing unit is configured:

a) to convert both images into a common coordinate system based on the determined poses; or b) to convert one image into the coordinate system of the other image based on the determined poses; or c) to determine conversion values based on the determined poses to convert future images into a common coordinate system or to convert a future image into the coordinate system of another future image.

19. An autonomously driving vehicle, comprising a camera, a LIDAR sensor, and a processing unit, wherein the camera and the LIDAR sensor are calibrated with respect to one another in accordance with claim 1, wherein the LIDAR sensor is configured to continuously monitor the road in front of the vehicle for obstacles, wherein the processing unit is configured to compare at least one object in the data of the LIDAR sensor that is smaller than a threshold value with the data of the camera in order, in the event that:

a) the object poses a risk of collision, to brake the vehicle and/or to initiate a steering movement and/or to issue a warning;

B) the object does not pose a risk of collision, not to intervene in the driving movement of the vehicle and/or not to issue a warning.

20. The autonomously driving vehicle of claim 19, wherein the vehicle is a forklift truck.

* * * * *